C. W. WRIGHT.
ANNUNCIATOR.
APPLICATION FILED JUNE 10, 1915.

1,263,012.

Patented Apr. 16, 1918.
6 SHEETS—SHEET 3.

UNITED STATES PATENT OFFICE.

CHARLES WESLEY WRIGHT, OF TOPEKA, KANSAS.

ANNUNCIATOR.

1,263,012.　　　　Specification of Letters Patent.　　Patented Apr. 16, 1918.

Application filed June 10, 1915.　Serial No. 33,362.

*To all whom it may concern:*

Be it known that I, CHARLES WESLEY WRIGHT, citizen of the United States, residing at Topeka, in the county of Shawnee and State of Kansas, have invented certain new and useful Improvements in Annunciators, of which the following is a specification.

This invention relates to indicating apparatus and particularly to annunciators which are adapted for use upon suburban and interurban railway cars to successively display to the occupants of the car the names of the different stations, localities or stops situated along the route of travel.

An illustrative embodiment of this invention is shown in the accompanying drawings, in which—

Fig. 9 is a plan view of the control means;

Fig. 10, is a view in side elevation of the pawl for directly actuating the winding spools of the annunciator control.

Fig. 10ª is an end view thereof.

Fig. 11 is a detail view of the pawl shifting means of the annunciator control.

Fig. 11ª is an edge view thereof.

Fig. 12, is a detail view of the member in the annunciator control for reversing the motor circuit, and Fig. 12ª is an edge view thereof.

Like numerals of reference designate like or corresponding parts throughout the several views.

Before proceeding to a more detail explanation of my invention, it should be clearly understood that while this device is designed primarily for the purpose stated, it can also be advantageously employed for other similar purposes in which it is necessary or desirable to display, successively, announcements, pictures, names, or the like, when previously arranged in proper sequence.

Referring now to the drawings by numerals, 1 designates as an entirety the annunciator and 2 as an entirety the control means therefor, the former, annunciator 1, being located conveniently within the car and in full view of the occupants thereof, and the latter, the control means 2, in such proximity to the car attendant as to be at all times subjected to his control.

In its preferred embodiment the annunciator 1 may be said to consist of a suitable box like casing 3, within which casing a display opening (not shown) is formed. A display tape or sheet 4 is arranged interiorly of the casing 3 to traverse the mentioned opening whereby to exhibit therethrough the station name or other delineation to be displayed. Spools 5 and 6 are arranged in parallelism within the casing 3 and to rotate on a vertical axis. A platform 7 affords a support for the mentioned spools to in this manner maintain them in such relation to the display opening (not shown) as to position the tape 4 directly thereover. Guide rollers 8, arranged one at each end of the opening, direct movement of the tape as it is reversely or otherwise wound and unwound through rotation of the spools. Brackets 9 support the rollers 8 in the manner desired.

Spool 5 is mounted on and rotatable with a vertically disposed driven shaft or spindle 10. One end of the shaft 10 is seated in a bearing 11 therefor affixed to the bottom of the casing. The platform 7 also acts as a bearing for the mentioned shaft. At one side of the platform and secured to the floor or bottom of the casing 3 as indicated at 12, is an electric motor 13. It is through operation of this motor that the spools 5 and 6 are driven, the running of the motor being subjected to control as will hereinafter appear.

Figure 2:
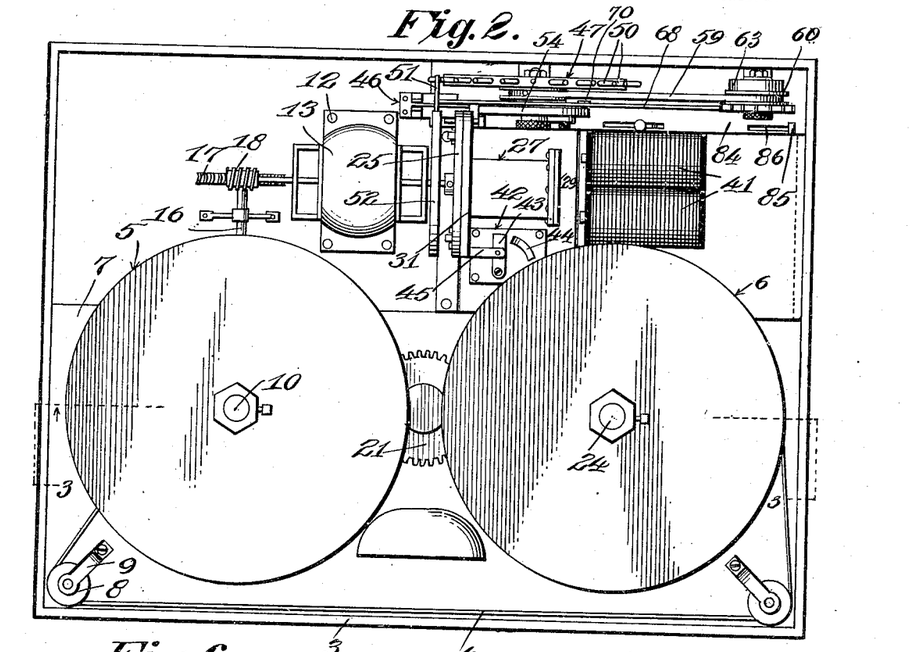
Fig. 2 is a plan view of the annunciator.
Figure 3:
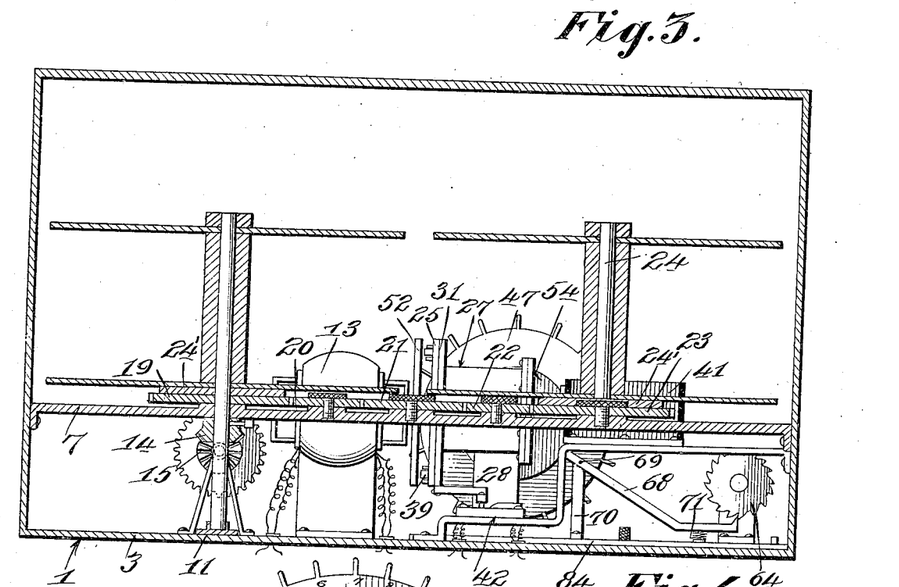
Fig. 3 is a section on the line 3—3 of Fig. 2.

A bevel gear 14 is keyed or otherwise secured to the spool shaft 10 with which gear a like gear 15 is in mesh. Gear 15 is mounted on a shaft 16 turnable in a horizontal plane below that of the platform 7, the mentioned shaft being provided at the opposite end from that mounting the gear 15 with a worm gear 17 which, as is evident upon reference to Fig. 2 is directly driven through rotation of a worm 18 mounted or affixed to the motor shaft.

Motion is transmitted from the spool 5 to the spool 6, or rather from the shaft 10 to the said spool 6 through the medium of a plurality of meshing gears designated respectively 19, 20, 21, 22 and 23, the former, gear 19 being affixed to the shaft 10 and the latter, gear 23, affixed to a shaft 24 which in turn supports a spool 6. A spacing block or disk 24' is interposed between each spool and the gear disposed directly therebeneath. Each of the several intermediate gears (20, 21 and 22) is mounted on a stub shaft, each shaft having detachable connection with the platform 7.

Figures 6, 7, 8:
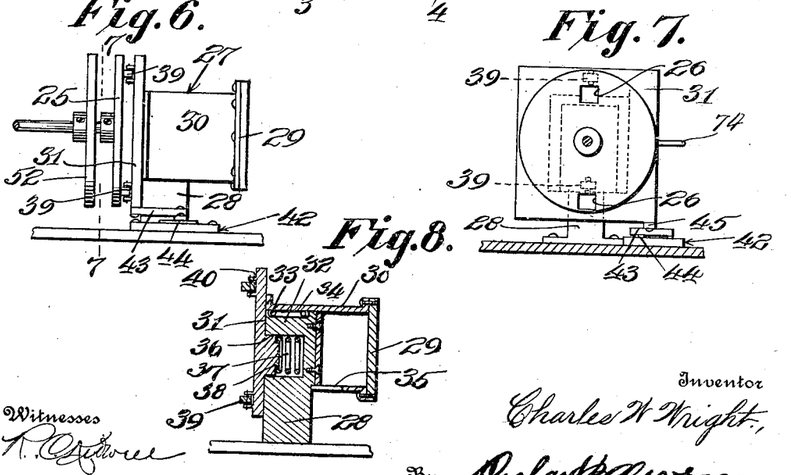
Fig. 6 is an elevation of the armature and its associate means.
Fig. 7 is a section on the line 7—7 of Fig. 6.
Fig. 8 is a vertical sectional view of the armature.

Coming now to a description of the control means for the motor, 25 designates a disk mounted on the motor shaft. The said disk 25 is provided with diametrically opposed apertures 26, the mentioned apertures, as is evident upon reference to Fig. 7 being formed in the disk, one directly adjacent the periphery thereof, and the other spaced inwardly therefrom. What may be termed an armature structure, designated as an entirety by the numeral 27 is located in adjacent proximity to the mentioned disk. The structure 27 includes a support 28, an armature proper 29, a shell 30, and a plate 31, the plate being secured in any suitable manner to the mentioned shell. A head portion 32 is formed upon the support 28 to operate within and support the shell, ball-bearings 33 seated in a ball race 34 formed in the head, facilitating sliding movement of the shell relatively to the support. A slot 35 is formed in the shell through which the support 28 extends, the terminals of the slot limiting, during movement of the armature, such movement. A recess 36 is formed in the head portion or enlargement 32 of the support, within which recess an expansion helical spring 37 is arranged, one end of the spring abutting the bottom recess wall and the opposite end an enlargement 38 formed upon the plate 31. Rollers 39 are mounted for turning movement between ears 40 projecting from the outer face of the armature plate, the rollers, like the openings 26 of the disk 25 being diametrically opposed and so situated with respect to the center of the disk as to register or coincide when in engagement with the disk 25, with the openings 26 formed therein. Said rollers 39 are of the anti-friction type, and, during rotation of the disk 25, ride upon the outer face of said disk.

One or a plurality of electro-magnets 41 are positioned in such proximity to the armature 29 as to attract, when energized, the said armature. The manner in which the electrical circuit including therein the magnetic devices is opened and closed will subsequently appear.

A switch apparatus 42 including a movable contact 43 and a stationary contact 44 is in circuit with the motor 13. The movable contact 43 of the said apparatus is actuatable through movement of the armature 29. The movable plate 31 of the armature structure is connected to the movable contact 43 by means of a link 45 pivoted to said contact, this arrangement, upon the energization of the magnetic devices 41 causing the circuit of which the switch apparatus 42 is a part to be closed. A closing of this circuit will start the motor 13 and consequently rotate the motor shaft. Upon deënergizing the magnetic devices 41, spring 37 will operate automatically to return the armature structure to its normal position, and, during such return movement, cause the electrical circuit of which the apparatus 42 is a part to be broken. The armature structure cannot, under any circumstances execute its return movement until disk 25 mounted on the motor shaft shall have completed a revolution and again brought the openings 26 into registry with the rollers 39.

Passing on to a description of the variable or adjustable switch control means illustrated to advantage in Fig. 4, 46 designates as an entirety the electrical switch, said switch being in circuit with the annunciator control means 2 subsequently to be described. A numbered or graduated disk 47 is mounted at one side of the disk 25 to rotate in a direction substantially at right angles thereto. The disk 47 is mounted on a shaft 48 journaled in upright bearings or supports 49. Teeth 50 are formed upon the periphery of the disk 47, the mentioned teeth being so situated with respect to a pin 51 as to be engaged thereby, the pin, as shown to advantage in Fig. 5, being projected from the periphery of a disk 52 secured to the motor shaft in spaced relation to the apertured disk 25. Each complete revolution of the disk 52 will cause disk 47 to rotate a degree or fraction of a revolution which, in the device here shown, is one-thirtieth. A leaf spring 53 is positioned to contact with the teeth 50 of the disk 47 to yieldingly retard its rotary movement.

A second or comparatively small disk 54 is mounted on the shaft 48 in spaced relation to the disk 47, the latter, disk 54, being provided with a plurality of circumferentially alined depressions 55 within any one of which a thumb screw 56 may be seated. The thumb screw 56 is carried by and is adjustable relatively to an indicator arm 57, said arm being turnable relatively to the shaft 48 and mounted to traverse, as the description implies, the outer face of the smaller disk.

Mounted on the shaft 48 between the disk 47 and the disk 54 is a drum 58 to which is secured one end of a tape 59. The opposite end of the mentioned tape is secured in any suitable manner to a second drum 60 spaced from the drum 58 and mounted on a shaft 61 journaled in upright bearings or supports 62. A coil spring 63 is associated with the drum 60 to automatically wind the tape thereon and, during a winding of the tape, cause shaft 48 and the disk thereon to be rotated. To control the action of the spring 63 I provide a ratchet wheel 64 the teeth of which are curved as indicated at 65 whereby to allow an associate pawl 66 to ride thereover during movement of the ratchet in one direction. The opposite edge of the teeth are straight as indicated at 67 to afford a bearing surface for the mentioned pawl and to preclude unwinding movement of the drum 60 when the pawl forcibly engages therewith.

Pawl 66 is formed upon the lower terminal of an angle arm 68 fulcrumed intermediate its ends as at 69 and supported in the mentioned angular position through the medium of uprights 70. As shown, the arm 68 extends upwardly from the pawl terminal 66 to overlap the shaft 48 and terminate at a point in adjacent proximity to the periphery of the disk 52. A spring 71 is arranged beneath the lower end of the arm to normally exert upward pressure thereon and to maintain the pawl 66 in engagement with the ratchet teeth. Upon the opposite end of the arm 68 from that having the pawl 66 formed thereon I provide a pivoted pawl 72, which pawl, by reason of the construction shown at 73 is movable independently of the arm in one direction, but therewith, should an attempt be made to move the pawl in the opposite direction. By such construction it is evident that the disk 52 while rotating in one direction, will cause the pin 51 thereof to contact the pawl without in any way causing arm 68 to be moved. Upon rotation of the disk in the opposite direction, the pawl, and consequently the arm, will be elevated to disengage the pawl 66 from the ratchet 64, the mentioned disengagement allowing the spring 63 to rotate shaft 48 until the mentioned pawl shall have again contacted the teeth of the ratchet. It is thus apparent that the disk 47 will be subjected to the control of the motor shaft so as to move intermittently therewith.

Spring 63 as is apparent from the preceding description, will automatically unwind to rotate the shaft 48, while forced rotation of the shaft 48 through movement of the wheel 52 will cause the spring to be automatically rewound whereby to subsequently permit of the unwinding action upon reverse rotation of the mentioned shaft.

Disk 25, like the disk 52, is equipped with a peripheral pin 74. An enlargement 75 is formed upon the free end of the arm 57 to overlap the periphery of disk 54, said enlargement, upon movement of the arm with the disk into a position in parallelism with the upper angular portion of the fulcrum bar 68 engaging the top of a vertically extending switch lever 76, said lever, together with a second lever 77 fulcrumed intermediate its ends as at 78, constituting the movable part of the switch appartaus 46. The pin 74 when the arm 57 shall have been moved into the position aforesaid, will engage therewith to depress the lever 76 and, by such depression, cause the lever or blade 77 to disengage opposed stationary contact elements 79 to in this manner break the electrical circuit of which the switch apparatus 46 is a part. A spring 80 is arranged beneath the lever 76 to normally maintain said lever in its uppermost position and the lever or blade 77 in engagement with the contacts 79. As a means whereby the lever 76 is held for vertical movement and in an upright position, I provide a guide pin 81, which pin, as shown to advantage in Fig. 14, operates in a slot 82 therefor formed in the lever. A bracket 83 carries the pin 81, said bracket also affording a support for the blade or lever 77.

The variable or adjustable switch control means above described is movable bodily or as an entirety into and out of operative relation with the disks 25 and 52. In Fig. 4, said control means is shown in operative relation with the mentioned disks. Bodily movement of the said means in the direction indicated by the arrow in the mentioned figure will so position said means as to render operation impossible. That this bodily movement may be practised with facility and ease, I mount said control means upon a suitable bed or base plate 84, which bed or base plate is slidable relatively to the floor or bottom of the casing 3. Pins 85 working within slots 86 formed in the base plate will guide the mentioned plate during its sliding movement.

Having described at length the detail construction and arrangement of the parts constituting the annunciator, I shall now proceed with a description, in detail, of the control means therefor. Said control means, as previously noted, is indicated as an entirety by the numeral 2. That the engineer, motorman, or other attendant may determine, by observation of the control means subjected to his control, just what movement of the tape 4 is produced by his operation of said means, I provide a second display sheet or tape 87. This sheet or tape 87 is a duplicate of the tape 4 forming a part of the annunciator, such duplication, as will hereinafter appear, causing the mentioned tapes to display simultaneously like names or other descriptive matter. A suitable casing 88 incloses the control means, the mentioned casing being provided with a sight opening 89 through which the names on the tape 87 are visible. Rollers 90 act as guides for the tape.

Figures 5, 13, 14:
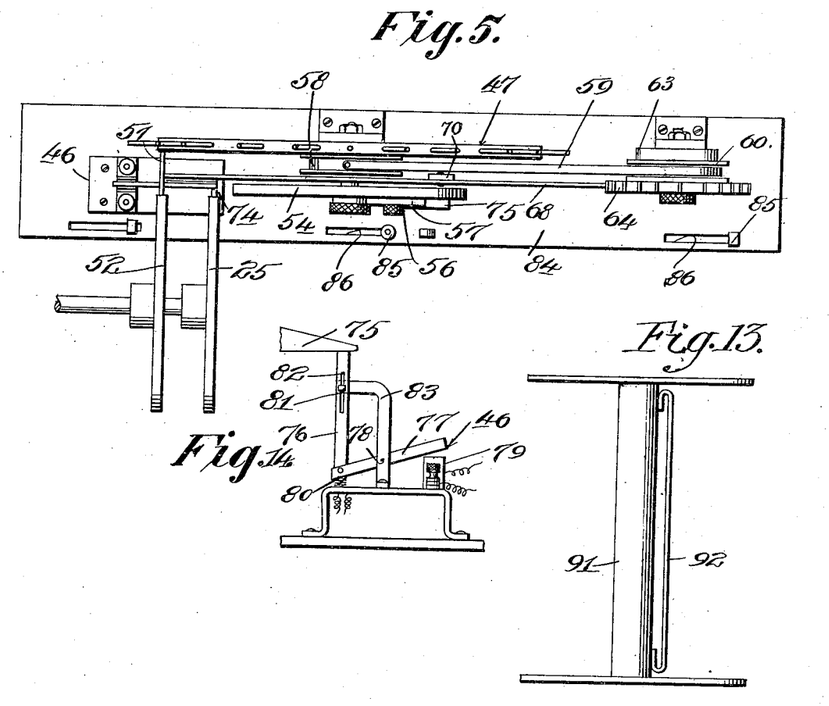
Fig. 5 is a plan view of the mechanism illustrated in Fig. 4.
Fig. 13 is an elevation of one of the spools or reels.
Fig. 14 is a detail elevation of one of the automatically operated switch devices.

The tape 87 at one end is wound or adapted to be wound about a spool or reel 91 which reel, as shown to advantage in Fig. 13 is equipped with a spring retaining element 92; said element directly engaging the tape to afford a holding means therefor. Reel or spool 91 is mounted on a shaft or spindle 93. The opposite end of the tape 87 from that engaging the spool 91 is wound or adapted to be wound about a second spool or reel 94, this latter spool being spring actuated as will hereinafter appear. Said spool 94 may be equipped with a spring retaining element similar to that above referred to and designated 92. Spool 94, like the spool 91, is mounted on a shaft or spindle 95 to extend with its axis in parallelism to the axis of the spool 91. The spring above referred to is of the coil type. One end of this spring designated 96 is affixed to the shaft 95 and the opposite end to a ratchet wheel 97, such arrangement subjecting the ratchet to spring control. Shaft 95 is further equipped or provided with a gear 98. Shaft 93 is equipped or provided with a gear 99. A train of gears (the gears being designated respectively 100, 101 and 102) connect the gears 98 and 99 that they may rotate in synchronism and at all times in the same direction.

A ratchet wheel 103 is mounted on the shaft 93 which ratchet wheel, with a like ratchet wheel 104 mounted on the shaft 95, (the teeth of the ratchets extending oppositely) is operable as hereinafter pointed out to rotate directly one or the other of the mentioned spools.

Figure 1:
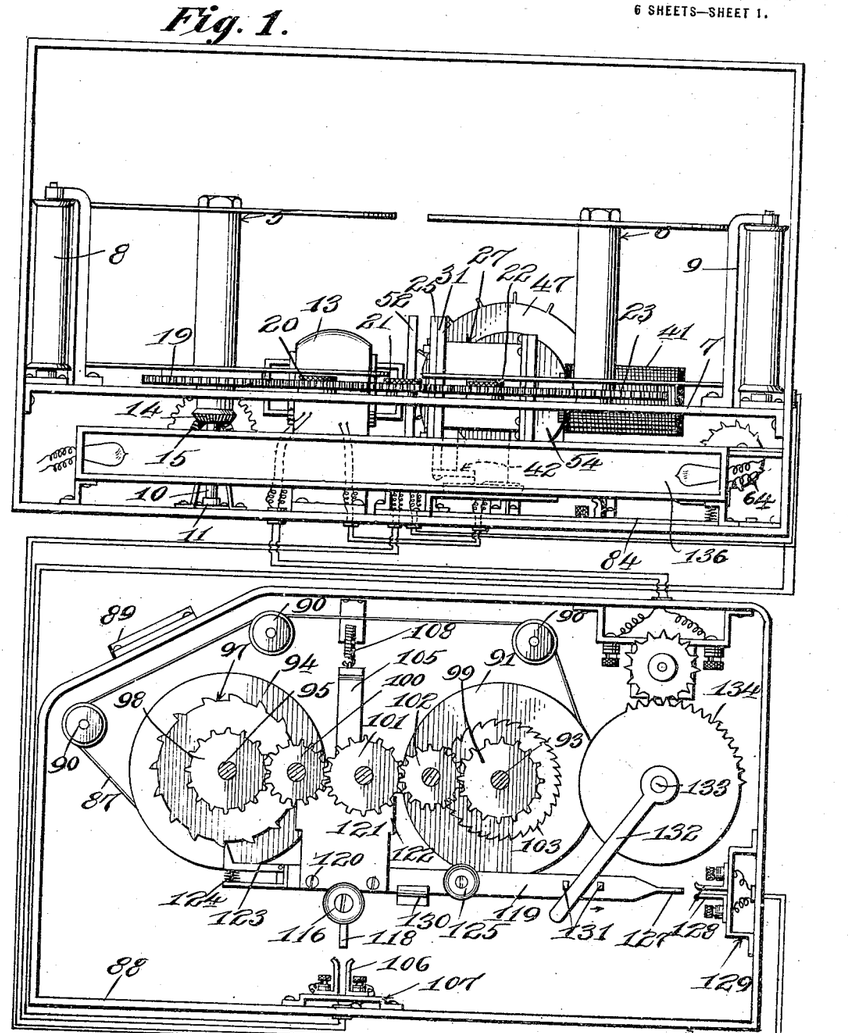
Figure 1 illustrates the apparatus complete, my improved interiorly located car annunciator being shown operatively connected with the control means therefor.

A vertically reciprocable support 105 is hung from the top of the casing 88 to operate directly above opposed stationary contacts 106 of an electrical switch apparatus 107. A spring 108, affixed at one end to the support and at its opposite end to the casing normally maintains said support in the position shown in Fig. 1 and out of engagement with the contacts 106. Said support, intermediate its ends, is enlarged as at 109, the enlargement being provided with an elongated slot or opening 110. Within this opening 110 pins 111 are fitted, the mentioned pins being affixed to and carried by a substantially U-shaped pawl-support 112, said support being reciprocable with the support 105.

Figures 9, 10, 10A, 11, 11A, 12, 12A:
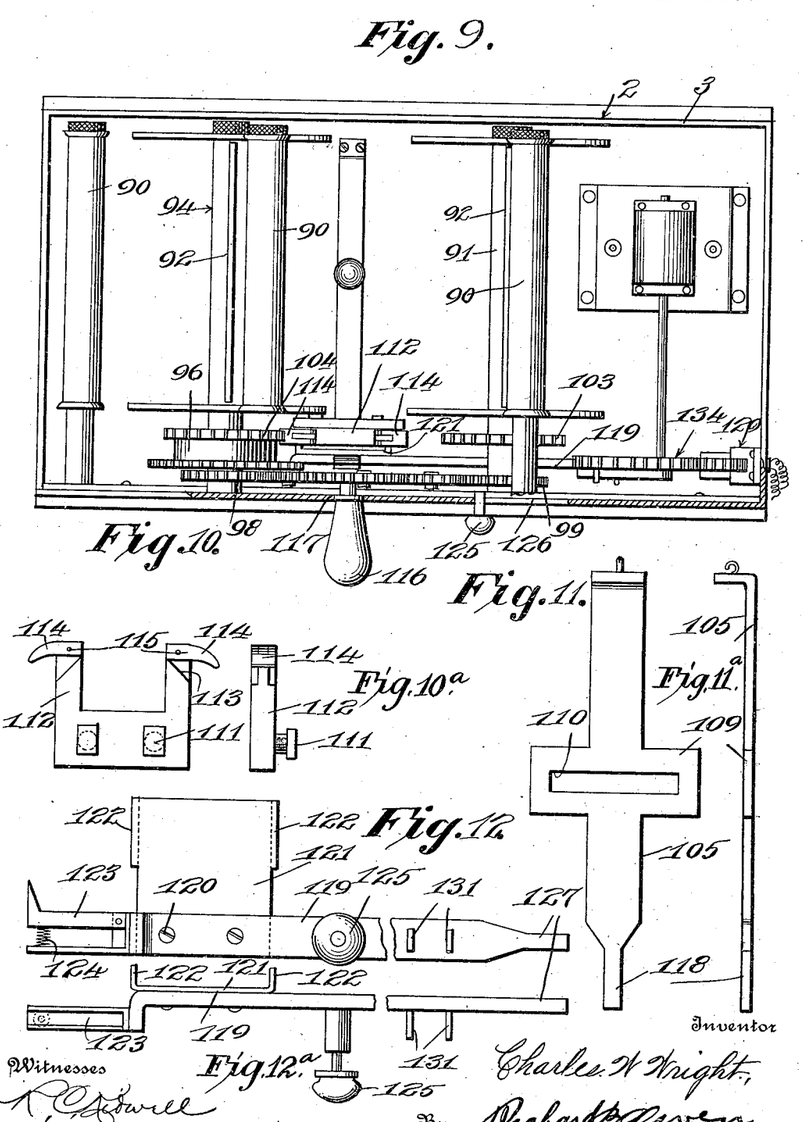
Figure 15:
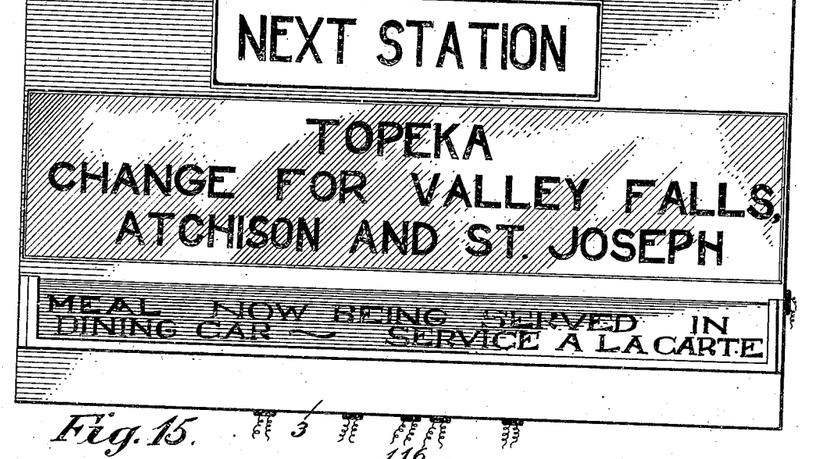
Figs. 15 and 16 are views in plan and elevation of the exhibitor and control casings.
Figure 16:
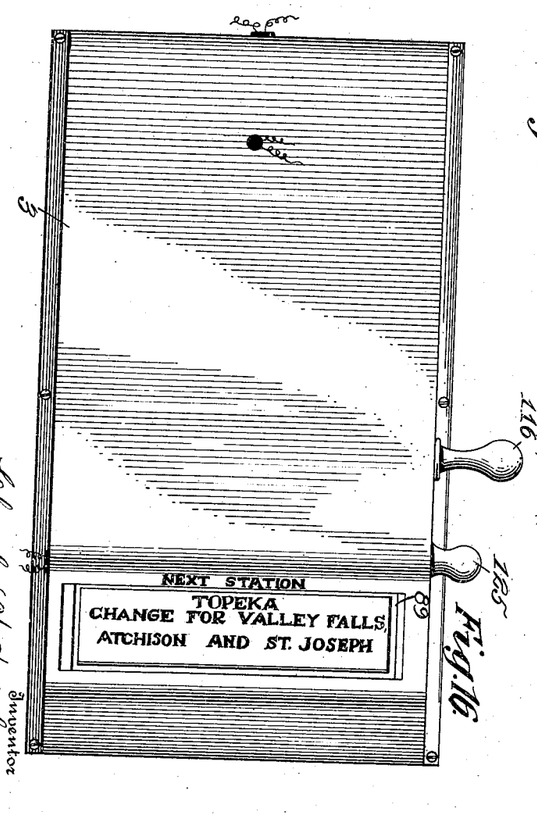

The extensions of the U-shaped pawl-support 112 are each cut away at an angle or as indicated at 113 and provided, each with a pawl 114 pivoted as at 115 or as shown to advantage in Fig. 10. The pawl upon the left hand side of the support 112 is adapted, during reciprocation of the support 105 for engagement with the teeth of ratchet wheel 104. The pawl upon the right hand side of the support 112 during reciprocation of the support 105 and subsequent to a shifting operation as will hereinafter appear, is adapted for engagement with the teeth of the ratchet 103. The engagement between one or the other of the mentioned pawls with one or the other of the ratchet wheels, and during reciprocation of the support 105 as aforesaid, causes rotation in synchronism of the spools 91 and 94 to either wind or unwind the tape 87. A handle 116 is affixed to the support 105, the handle operating in a vertical slot therefor 117 formed in the casing 88. To attain the reciprocatory movement, it is but necessary to manipulate the handle 116. The lower extremity of the support 105 is reduced to provide a movable contact 118, the said contact engaging with the contacts 106 to close the electrical circuit of which the switch apparatus 107 is a part. A second or horizontally reciprocable support 119 operates in conjunction with the support 105 to control rotation of the spools 91 and 94. To the support 119 is secured as at 120 an angle plate 121. Extensions 122 are formed upon this plate 121 to overlap or embrace the pawl support 112, such engagement causing not only the pawl-support but the support 105 to move horizontally with the support 119, should the latter be operated as will hereinafter appear. A pivoted pawl 123 is affixed to the support 119 at one end thereof, the said pawl being engaged by a spring 124, the mentioned spring normally maintaining the pawl in engagement with the ratchet wheel 97. The teeth on the ratchet wheel 97 are like unto the teeth formed on ratchet wheel 64 previously described, such construction permitting rotation of the wheel in one direction only, while the pawl is mounted to operatively engage therewith. Support 119 is further equipped with a handle 125, which handle operates within a slot 126 formed in the casing 88. Movement of the support, through manipulation of the handle 125, bodily in the direction indicated by the arrow in Fig. 1 will cause a contact 127 formed at one end thereof to engage spaced contacts 128 forming a part of a switch device 129, the said device forming a part of and being in circuit with the switch apparatus 46 previously described. Said switch apparatus 46 is in circuit with the electro-magnetic devices 41, such arrangement, when the contact 127 engages the contact 128 causing the said electro-magnetic devices to be energized, current first passing through the switch apparatus 46, it at that time being closed. A bracket 130 acts as a support for the movable support 119. Pins 131 project laterally of the support 119 to actuate an arm 132 oscillatable from a point 133. Said arm 132 is operable to control a motor reverse 134.

Operation of the complete apparatus is briefly as follows: I will first assume that a car equipped with my improved annunciator device is operating upon what may be termed a "loop line", that is, a line in which the car is returned to its starting point without traversing the same route twice. When starting, the tape 87 is wound upon the spool or reel 94 in the control box and tape 4 of the annunciator, wound upon the spool 5.

Figure 4:
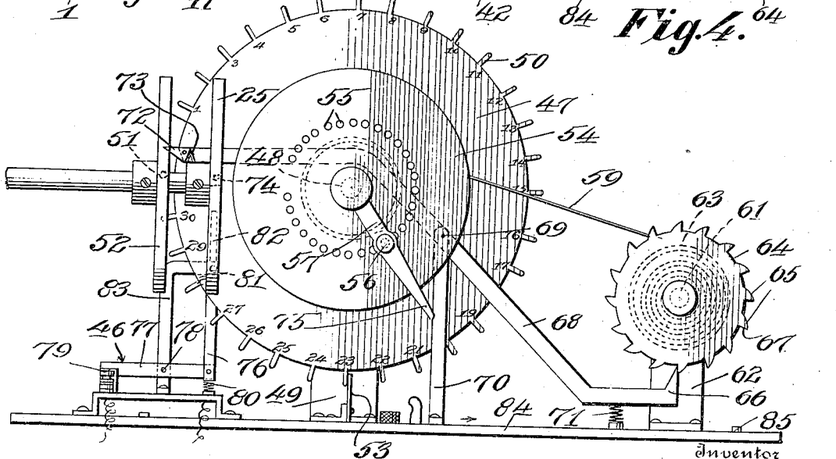
Fig. 4 is an enlarged elevation of the variable or adjustable switch control means.

Now assuming further that there are but twenty stations or stops along the route of travel, I will, before making the run or traversing the loop, set the arm 57 at "twenty" as indicated in Fig. 4; lock the said arm in its set position through manipulation of thumb screw 56 and subsequently rotate the arm, the disk 54 and the disk 47 until the enlargement 75 of said arm shall rest upon the top surface of the pin 74. When thus positioned, the car may be started. When in motion, and before reaching the first station or stop, the motorman or other attendant should depress handle 116 to actuate the support 105. Depression of the support 105 will cause the left hand pawl 114 of the pawl support 112 to contact with the teeth of ratchet 104, such engagement causing said ratchet and the shaft 95 to be partially rotated. The gears 98, 100, 101, 102 and 99 transmit such movement of the shaft 95 to the shaft 93, and as the spools 94 and 91 are mounted respectively upon the mentioned shafts, it is evident that the tape 87, through rotation of the spools (in synchronism) will move beneath the opening 89 in the casing 88. The spools 5 and 6 of the annunciator, and spools 91 and 94 of the exhibitor, are releasably held in engagement with their respective shafts through the medium of set screws and nuts as will be noted from the drawing, and during operation of either of these devices, the set screw of the winding roll is tightened to engage the same with the shaft while the set screw or nut of the unwinding roll is disengaged from the shaft thereby permitting the tape to wind from one roll to the other without binding or straining the tape. Simultaneously with the depression of the support 105, pivoted pawl 123 is withdrawn from engagement with ratchet wheel 97 to allow said ratchet wheel to move, by reason of the movement of the shaft 95 sufficiently to bring the next or succeeding tooth into a position to be engaged by the mentioned pawl when handle 116 shall have been released. Continued rotation of the shaft 95 in the manner described will cause the spring 96 to be tightly coiled and later, when it is desired that the spool be reversely wound, act automatically to effect such reverse rotation within the control box or casing. The depression of the support 105 against tension of the spring 108 will also make the electrical circuit necessary to energization of the magnets 41, this, by reason of the engagement of the contact 118 with the contacts 106. Magnets 41 will attract armature 29 and, through movement of the armature structure, cause the movable contact 43 to engage the stationary contact 44 and the electrical circuit within which the contacts are arranged to be closed. The closing of this last mentioned circuit will set in motion motor 13 to in this manner drive the motor shaft. Movement of the armature structure will also withdraw the rollers 39 from fitting engagement with the apertures or openings 26 therefor formed in the disk 25. The rollers having been withdrawn, it is apparent that the disk 25 will rotate.

In the meantime, handle 116 is released, and redrawn to its normal elevated position through action of spring 108. Such movement of the support 105 will cause the electrical circuit necessary to energization of the magnets 41 to be broken and the magnets thus deënergized.

The armature structure however cannot disengage the magnets, even though the magnets be deënergized, until disk 25 shall have been rotated or executed a single complete revolution. Upon the completion of a single revolution, spring 37 will operate automatically to recede or reposition the rollers within the mentioned openings therefor. This return movement of the armature structure through action of the spring 37 will instantly break the circut necessary to operation of the motor 13.

Rotation of the motor shaft, at intervals, through operation of the motor, will cause pin 51 of the disk 52 to engage the teeth on the disk 47, such engagement moving said disk in step-like progress, one step upon each individual depression of the handle 116. Twenty such depressions of the handle will cause the arm 57 to assume the position shown in Fig. 4.

Rotation of the disk 52 will cause the pin to engage with the pawl 72, such engagement, by reason of the specially constructed pawl-support, causing said pawl and the arm 68 to be moved in synchronism. As the pawl 66 is withdrawn from engagement with the ratchet 64, through movement of the rod 68, it is evident that the spring 63 will unwind until the pawl 66 shall have again engaged with the ratchet. The unwinding action of the spring 63 will cause disk 47, disk 54 and arm 57 to rotate.

When the car shall have again reached the point from whence it started, handle 125 is manipulated to move contact 127 in engagement with the contact 128, such engagement closing the electrical circuit of which switch apparatus 129 is a part. The electro-magnetic devices 41 are within this circuit as is also the switch apparatus 46. Movement of the support 119 through manipulation of the handle 125 will also actuate arm 132 to in turn operate the "motor reverse." The motor reverse having been operated, it is evident that the motor shaft will, when the electro-magnetic devices are energized, begin to rotate in a reverse direction and to in this manner cause the disks 52 and 25 to correspondingly reversely turn.

I desire to call attention to the fact that a suitable means may be provided whereby support 119 is held with the contact 127 in engagement with the contacts 128. So long as the contacts are thus engaged, the motor will continue to operate. A reverse rotation of the motor-shaft will cause disk 47, disk 54 and arm 57 to be reversely rotated and consequently drum 58 to so turn or revolve as to cause tape 59 to be wound thereon. The mentioned winding of the tape 59 will re-coil spring 63, pawl 66 operating automatically to hold said spring during such re-coil. Such reverse rotation of disk 52 will swing arm 57 into its original or starting position and position the enlargement 75 thereof directly above the pin 75. Continued rotation of the disk 25 will cause the pin to come in contact with the enlargement 75 and by the pressure exerted thereon cause the said enlargement to depress the lever 76 and break the circuit of which switch apparatus 46 is a part. Such a break in the circuit will cause the motor to be stopped.

In operating upon what may be termed a "straight line" route, it will of course be obvious that although the horizontal arm 119 must be swung to the right to operate the motor reversing switch, the depending contact 118 will still remain in a position for engagement with the spaced contacts 106 in view of the slotted connection between said arm 119 and the vertical arm 105, this construction being set forth in detail in Figs. 11 and 12. A shifting movement of the support 119 will reverse the motor and cause, as is evident from the foregoing disclosure, the motor shaft to be reversely rotated and the spools to be reversely turned thereby moving for display the names on the tape of the annunciator in sequence inverse to that resulting from the operation of the support 105 prior to the mentioned shifting movement. In the controlling means the tape 87 is shifted by engagement of the right hand pawl 114 with the ratchet wheel 96, the pawl 114 having been shifted by movement of the arm 119 in a position to engage said ratchet, thereby causing the tape 87 to be moved so as to display the name in an inverse order. If desired, a light 135 (preferably incandescent) may be arranged within the annunciator casing 3, directly behind the tape or screen to illuminate and display clearly the names contained thereon. I have shown at the foot or base of the annunciator casing an illuminated sign structure 136 which in actual practice may be utilized for any one of several purposes thought most appropriate.

From the foregoing, taken in connection with the accompanying drawings it is apparent that, while operating a "straight line" route, the mechanism carried by the base-support 84 is unnecessary; that the means utilized to make and break the several electrical circuits is absolutely automatic and so regulated as to operate only as occasion demands; and that the entire organization (including both display members and sheets) is controlled through manual manipulation of two operating levers which in actual practice are positioned in such proximity to the vehicle attendant as to be conveniently operated, one intermittently during travel of the vehicle and the other only when the vehicle shall have reached one of the terminals of the route.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In an annunciator, a display member, an electrical circuit including therein a motor, a switch device and an electro-magnetic device, control mechanism including a member movable to open and close the circuit, an armature movable upon energization of the magnet to operate the switch mechanism and to control operation of the motor, rollers carried by and movable with the armature, a disk rotatable upon operation of the motor, the mentioned rollers being engageable with the said disk, said disk being provided with openings, means engaging the armature to at all times exert pressure thereon to move said armature out of engagement with said magnet, said means operating to move the mentioned rollers into the openings in the disk to actuate the mentioned switch mechanism and to stop the motor, and means to move the display member through operation of the motor.

2. In an annunciator, a display sheet, a pair of spaced shafts, spools on said shafts for receiving the ends of the display sheet, means for releasably fixing the spools to the shafts, gearing connecting the shafts for rotation in synchronism, a motor gearing operable by said motor for rotating one of the shafts, an electric switch in series with the motor and a source of current, an electromagnet operable when energized to move the switch to closed position, whereby to start the motor, means operable after the magnets have become deënergized for retaining the switch in closed position until the motor has completed a revolution and thereafter to return the switch to open position, and means for energizing the magnets.

3. In an annunciator, a display sheet, a pair of shafts, spools on the shafts, whereby to receive the ends of the display sheet, means for releasably fixing the spools to the shafts, gearing connecting the shafts for rotation in synchronism, a motor, gearing operable by said motor for rotating one of shafts, a switch in series with said motor and a source of current, a magnet adapted when energized to move the switch to closed position whereby to start the motor to move the display sheet, means operable after the magnets have become deënergized to retain the switch in closed position until the motor has completed a revolution and for automatically thereafter moving the switch to open position, a rotatable element, an element adjustable circumferentially on said rotatable element, a resilient element, means operable by the motor for rotating said rotatable element and for placing and retaining the resilient element under strain, means for reversing rotation of the motor at the end of a trip, said retaining means being releasable upon said reverse rotation whereby to release the resilient element to return the rotatable element to normal position, a switch in circuit with the motor and a source of current, said switch being engageable by the adjustable element of the rotatable element when said rotatable element is returned to normal position whereby to deënergize the motor thereby stopping the display sheet at the starting point thereof, and means for energizing the magnet.

4. In an annunciator, a movable display sheet, a motor, means for operating the display sheet from the motor, electrically operable means for starting and stopping the motor whereby to progressively move the display sheet, a disk rotatable with the motor, a radial pin mounted on the periphery of the disk, a second disk rotatable about an axle at right angles to the axis of rotation of the first mentioned disk, a plurality of radial pins on the periphery of the second mentioned disk adapted to be engaged by the pin of the first mentioned disk, a drum rotatable with the second mentioned disk, a tape passed around said drum, a second drum around which the opposite end of the tape passes, a coil spring for resisting rotation of the said second mentioned drum, a ratchet wheel rotatable with said second mentioned drum, a pawl engaging said ratchet, a third disk rotatable with the motor and having a peripheral radial pin adapted, during rotation of the motor to engage the pawl, a spring engaging the pawl for preventing disengagement thereof from the ratchet during such engagement of the pawl with the mentioned pin, an element rotatable with the second mentioned disk, means for reversing rotation of the motor at the end of a trip, the pawl being engageable by its coacting pin on such reverse motion whereby to disengage the pawl, to permit the spring to unwind to return the second mentioned disk and rotatable element thereon to normal position, a switch in circuit with the motor and a source of current engageable by the rotatable element of the second mentioned disk, whereby to stop the motor when the tape has been rewound to the starting point.

In testimony whereof I affix my signature in presence of two witnesses.

CHARLES WESLEY WRIGHT.

Witnesses:
  MARY M. WRIGHT,
  T. W. WRIGHT.

Copies of this patent may be obtained for five cents each, by addressing the "Commissioner of Patents, Washington, D. C."